US010364183B2

(12) United States Patent
Yammine et al.

(10) Patent No.: US 10,364,183 B2
(45) Date of Patent: Jul. 30, 2019

(54) COMPOSITE COMPRISING A MINERAL WOOL COMPRISING A SUGAR

(71) Applicant: SAINT-GOBAIN ISOVER, Courbevoie (FR)

(72) Inventors: Joumana Yammine, Paris (FR); Elodie Bouny, Lattes (FR); Edouard Obert, Fleurines (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 178 days.

(21) Appl. No.: 15/301,864

(22) PCT Filed: Apr. 9, 2015

(86) PCT No.: PCT/FR2015/050957
§ 371 (c)(1),
(2) Date: Oct. 4, 2016

(87) PCT Pub. No.: WO2015/155486
PCT Pub. Date: Oct. 15, 2015

(65) Prior Publication Data
US 2017/0144912 A1 May 25, 2017

(30) Foreign Application Priority Data
Apr. 10, 2014 (FR) .................................. 14 53215

(51) Int. Cl.
| | |
|---|---|
| *C03B 1/02* | (2006.01) |
| *C03C 25/34* | (2006.01) |
| *C03C 25/42* | (2006.01) |
| *C04B 20/10* | (2006.01) |
| *C04B 28/04* | (2006.01) |
| *C04B 18/14* | (2006.01) |
| *C04B 14/46* | (2006.01) |
| *C03C 25/24* | (2018.01) |
| *C03B 37/01* | (2006.01) |
| *C03C 25/47* | (2018.01) |
| *C03C 25/32* | (2018.01) |
| *C04B 28/18* | (2006.01) |
| *C04B 28/26* | (2006.01) |
| *C03C 25/25* | (2018.01) |
| *C04B 111/10* | (2006.01) |

(52) U.S. Cl.
CPC ................ *C03C 25/47* (2018.01); *C03B 1/02* (2013.01); *C03B 37/01* (2013.01); *C03C 25/25* (2018.01); *C03C 25/32* (2013.01); *C03C 25/34* (2013.01); *C03C 25/42* (2013.01); *C04B 14/46* (2013.01); *C04B 18/141* (2013.01); *C04B 20/1022* (2013.01); *C04B 28/04* (2013.01); *C04B 28/18* (2013.01); *C04B 28/26* (2013.01); *C04B 2111/1037* (2013.01); *Y02W 30/94* (2015.05)

(58) Field of Classification Search
CPC .. C03B 1/00; C03B 1/02; C03B 37/00; C03B 37/01; C03B 37/04–37/055; C03B 37/08–37/095
See application file for complete search history.

(56) References Cited

U.S. PATENT DOCUMENTS

| | | | | | |
|---|---|---|---|---|---|
| 2,432,981 | A | * | 12/1947 | Abrahams et al. ...... | C04B 28/22 106/681 |
| 2,578,110 | A | * | 12/1951 | Tooley ...................... | C03B 1/00 501/29 |
| 2,904,444 | A | * | 9/1959 | Hoopes ................... | C04B 28/18 106/612 |
| 4,405,723 | A | * | 9/1983 | Kainzner ................ | C03B 37/02 501/36 |
| 4,617,075 | A | | 10/1986 | Wetzel et al. | |
| 5,100,840 | A | | 3/1992 | Urabe et al. | |

(Continued)

FOREIGN PATENT DOCUMENTS

| | | |
|---|---|---|
| BY | 13249 C1 | 6/2010 |
| EP | 0 526 697 A3 | 2/1993 |

(Continued)

OTHER PUBLICATIONS

PQ Europe (PQ Europe, Sodium and Potassium silcates:versatile compunds for yoru applications, https://www.pqcorp.com/docs/default-source/recommended-literature/pq-corporation/lithium-silicate/sodium-and-potassium-silicates-brochure-eng-oct-2004.pdf?sfvrsn=d22426fb_3 , Oct. 2004.*

(Continued)

*Primary Examiner* — Jason L Lazorcik
(74) *Attorney, Agent, or Firm* — Oblon, McClelland, Maier & Neustadt, L.L.P.

(57) ABSTRACT

The invention relates to a process for the preparation of a shaped composite, comprising the preparation of a mixture into which fragments of mineral wool comprising a size comprising a sugar, a non-cement silica carrier distinct from the wool, a non-cement alkali metal carrier distinct from the wool, and water, are introduced, the non-cement silica carrier and the non-cement alkali metal carrier forming, with the water, a mineral binder which gradually solidifies around the solid particles present in the mixture, and then the shaping of the mixture into a shaped composite, in particular into briquettes. The invention also relates to a process for the manufacture of mineral wool, in which a molten mass is produced which is converted into mineral wool by means of a fiberizing device, the shaped composite being introduced as vitrifiable charge into a melting chamber, such as a cupola furnace.

33 Claims, No Drawings

(56) References Cited

U.S. PATENT DOCUMENTS

| | | | |
|---|---|---|---|
| 5,472,917 A * | 12/1995 | Talling | C03B 1/02 106/714 |
| 5,556,457 A | 9/1996 | Terza et al. | |
| 5,820,668 A | 10/1998 | Comrie | |
| 6,074,967 A * | 6/2000 | Erskine | C03B 1/02 501/27 |
| 9,550,691 B2 | 1/2017 | Vitorica Murguia et al. | |
| 9,550,697 B2 | 1/2017 | Vitorica Murguia et al. | |
| 2009/0155603 A1 | 6/2009 | Zheng et al. | |
| 2010/0282996 A1 | 11/2010 | Jaffrennou et al. | |
| 2012/0070645 A1* | 3/2012 | Jaffrennou | C08L 83/00 428/221 |
| 2012/0085962 A1* | 4/2012 | Jaffrennou | C03C 25/26 252/62 |
| 2012/0161059 A1* | 6/2012 | Obert | B60S 1/481 252/62 |
| 2012/0263934 A1* | 10/2012 | Jaffrennou | C03C 25/32 428/221 |
| 2012/0315458 A1* | 12/2012 | Zheng | B32B 5/02 428/292.1 |
| 2012/0319029 A1* | 12/2012 | Jaffrennou | C03C 25/32 252/62 |
| 2013/0026408 A1* | 1/2013 | Jaffrennou | C03C 25/26 252/8.83 |
| 2013/0032749 A1* | 2/2013 | Jaffrennou | C03C 25/321 252/62 |
| 2013/0165553 A1* | 6/2013 | Cuypers | C03B 1/02 524/5 |
| 2014/0120348 A1* | 5/2014 | Didier | C03C 25/26 428/389 |
| 2015/0203399 A1* | 7/2015 | Didier | C03C 25/26 428/426 |
| 2016/0168009 A1* | 6/2016 | Vitorica Murguia | C03B 1/02 501/29 |
| 2016/0347637 A1 | 12/2016 | Vitorica Murguia et al. | |

FOREIGN PATENT DOCUMENTS

| | | |
|---|---|---|
| JP | 57-100970 A | 6/1982 |
| JP | 7-286011 A | 10/1995 |
| WO | WO 95/34514 A1 | 12/1995 |
| WO | WO 95/34517 A1 | 12/1995 |
| WO | 97/25285 A1 | 7/1997 |
| WO | WO 97/25256 A1 | 7/1997 |

OTHER PUBLICATIONS

International Search Report dated Jul. 8, 2015 in PCT/FR2015/050957 filed Apr. 9, 2015.

Search Report dated Nov. 12, 2018 in Russian Patent Application No. 2016144009/03 (submitting Engiish translation only). citing documents AA & AO-AS therein, 2 pages.

* cited by examiner

COMPOSITE COMPRISING A MINERAL WOOL COMPRISING A SUGAR

The invention relates to the field of the enhancement in value of waste products based on mineral wool, in particular on rock wool or on glass wool. Normally, the waste products from the production of mineral wool are agglomerated in the form of shaped composites, frequently denoted by the term of "briquettes" (other names being available essentially according to the geometry of the shaped composite), in order to be recycled in the process for the manufacture of mineral wool. These shaped composites, in particular in the form of briquettes, can be introduced into a melting furnace, which itself feeds a fiberizing device. This technique is particularly useful when it is desired to reintroduce particulate materials into furnaces where strong gas movements prevail.

The invention thus also relates to the field of the manufacture of mineral wool. According to one process, known as external centrifugation, mineral wool is obtained from a melting mineral mass poured onto an assembly of rotating rotors, the molten mass being ejected from the periphery of the rotors and picked up by a drawing gas stream and being thus converted into fibers. The wool is subsequently impregnated with a sizing composition. The sizing composition is sprayed over the fibers as they are formed and then the mass of sized fibers is collected on a receiving member and conveyed to a device for forming a strip of mineral wool felt. The size is intended to give the wool its cohesion by forming, after curing and crosslinking, bridges between the fibers.

This process produces a not insignificant amount of waste products, on the one hand during the fiberizing, where waste products comprising solidified mineral material and size, said solidified mineral material generally comprising fibers and shot, and, on the other hand, after formation of the felt as a result of cuttings to shape intended to rectify the edges of the felt or to bring the products to the correct size. Finally, it happens that the production does not provide the expected quality and some batches are discarded.

According to another process, referred to as internal centrifugation, the molten material is this time fiberized through a fiberizing member in the form of a disc pierced at its periphery, the material being ejected through the pierced wall of the disc in the form of filaments which are drawn by a drawing gas stream. This technique produces a fiberizing yield which is much greater than that of the external centrifugation technique and does not produce shot. However, cutting waste is inevitable.

These mineral-based waste products can be enhanced in value in the circuit for the manufacture of mineral wool, in particular by remelting with the starting materials feeding the melting furnace. This recycling generally involves the preparation of composites comprising these waste products, said composites being produced by shaping, in particular a molding, of a mixture of mineral wool waste products with a mineral binder generally comprising a cement, followed by a treatment which provides for the setting of the binder. Putting in the form of briquettes makes it possible to easily convey these waste products and facilitates the process of reuse thereof, in particular the reintroduction thereof into a melting furnace.

In the case of a rock wool, this furnace can in particular be of the cupola furnace type, in which the charge of solid starting material formed of blocks of natural rocks forms, with blocks of solid fuel (coke) in alternating layers, a self-supporting column through which the combustion gases escape. As the melting takes place in the bottom part of the column, the latter is recharged via the top with fuel and rock. These furnaces do not allow the introduction of starting materials as powder or light particles which do not exhibit the required ability to form a stable solid material layer in the vertical column. The conversion into shaped composite, such as into briquette, confers this ability. The aim is for the briquette to develop a good mechanical strength fairly rapidly after it is formed and for it not to disintegrate during the handling thereof and the transportation thereof.

According to a recent development of the technique, provision has been made to manufacture mineral wool with sizes, the composition of which involves starting materials resulting from renewable resources, in particular sugars. However, it has been noticed that the use of a size comprising a sugar to bind the mineral wool results in briquettes which are not very robust, making it very difficult to manufacture and/or use them.

The invention solves the abovementioned problem.

The invention is based in part on the discovery that the sugar present in the size interacted unfavorably with the cement, interfering with and even preventing the solidification thereof. Even if the use of a cement is not excluded in the context of the present invention, it is recommended to lower its proportion and to replace it, at least partially, indeed even completely, with a mineral binder, the description of which will follow.

The invention relates to a process for the preparation of a shaped composite, comprising the preparation of a mixture into which fragments of mineral wool comprising a size comprising a sugar, a non-cement silica carrier distinct from the wool, a non-cement alkali metal carrier distinct from the wool, and water, are introduced, the non-cement silica carrier and the non-cement alkali metal carrier forming, with the water, a mineral binder which gradually solidifies around the solid particles present in the mixture, and then the shaping of the mixture into a shaped composite, such as a briquette. The shaping generally involves a molding.

The expression "fragments of mineral wool" denotes here all waste products resulting from the production of mineral wool, including mineral materials solidified in the form of shot or unfiberized materials, or recovered in the form of solid fly-off materials, or packets of fibers recovered (by washing operations) on the various receiving or conveying surfaces, and also cut mineral wool felt.

The expression "non-cement" that indicates the compound to which it is attached is not a cement. A cement is an anhydrous material made of powder comprising crystalline calcium silicate or crystalline calcium aluminate. It is a hydraulic mineral compound resulting in the formation, in the presence of water, of hydrated calcium silicate or hydrated calcium aluminate. A cement is essentially crystalline and comprises less than 10% by weight of amorphous material. In a cement, the calcium silicate or the calcium aluminate are crystalline phases. Portland cement, white cement, high-alumina cement, sulfoaluminate cement and prompt natural cement are known. A slag and an alkali metal silicate are not regarded by a person skilled in the art as being cements.

The non-cement silica carrier is targeted at a material having hydraulic properties, which forms silicate ions in the presence of water. The non-cement silica carrier can optionally exhibit a crystalline nature if it easily dissolves in water. This is the case in particular with a sodium silicate, which can in particular be introduced into the mixture in the form of an aqueous solution. On the other hand, if a slag is used as non-cement silica carrier, it is preferably advisable for that to be amorphous to more than 80% by weight and more preferably to more than 90% by weight, for it to comprise at least 10% by weight of silica and for it to exhibit a fine particle size, in particular such that its D50 is less than or equal to 100 μm and more preferably less than or equal to 50 μm. Such slags can be obtained as byproducts of the iron and steel industry. They get their glassy structure, that is to say their essentially amorphous nature, from the water quenching treatments which are applied to them after collecting, which confers latent hydraulic properties on them. When it is dry, the non-cement silica carrier is preferably a completely or partially amorphous solid mineral compound. It is amorphous preferably to more than 80% by weight and more preferably to more than 90% by weight. It preferably comprises at least 10% by weight of silica ($SiO_2$) and more preferably at least 20% by weight of silica. It optionally comprises alumina. It can comprise, in a reduced amount, iron oxide, alkali metal oxide, alkaline earth metal oxide, a phosphate, a sulfate, a sulfide or titanium oxide. It is preferably sufficiently fine to at least partially dissolve in an aqueous medium. Thus, the particle size of the non-cement silica carrier is preferably such that the D50 is less than or equal to 100 μm and more preferably less than or equal to 50 μm. In a glass-making application, this silica carrier is a source of $SiO_2$ in the final glass.

The silica carrier can in particular be chosen from the following list:
  an alkali metal silicate;
  calcined or natural clay, kaolinite, illite or montmorillonite;
  calcined kaolin or dehydrated kaolin, such as mainly amorphous metakaolin which can comprise kaolinite crystals;
  silica fume;
  fly ash (class C, class F);
  biomass ash;
  blast furnace slag;
  steelworks slag;
  rice husk ash, rice chaff ash;
  calcined synthetic or natural pozzolana;
  natural or calcined volcanic ash;
  diatomite.

From the above list, it is preferable to use compounds which are not very expensive, such as: a slag, a fly ash, a calcined synthetic or natural pozzolana, calcined or natural clay or a metakaolin.

A slag is a byproduct from the iron and steel industry and generally exhibits an $SiO_2/CaO$ ratio (by weight)<1.5 and the sum of its content of CaO and of $SiO_2$ represents more than 45% of its weight.

The non-cement alkali metal carrier comprises an alkali metal and forms alkali metal ions in the presence of water. It preferably comprises at least 20% by weight of alkali metal (it is the percentage of the alkali metal element, such as Na or K, and not the percentage of its oxide) and preferably at least 30% by weight of alkali metal. The non-cement alkali metal carrier can be chosen from the following list:
  R—OH, $R_2CO_3$, $RHCO_3$ or $R_2SO_4$ with R chosen from Na, K or Li,
  anhydrous sodium silicate or sodium silicate in the hydrated form (metasilicate $Na_2SiO_3$, disilicate $Na_2Si_2O_5$, orthosilicate $Na_4SiO_4$ or pyrosilicate $Na_6Si_2O_7$); an alkali metal (potassium or lithium) silicate.

A preferred non-cement alkali metal carrier can be chosen from: NaOH, $Na_2CO_3$, $NaHCO_3$, a trona (natural sodium carbonate) or an alkali metal silicate. Sodium hydroxide NaOH is the non-cement alkali metal carrier more preferred from the viewpoint of its reactivity. In a glassmaking application, this alkali metal carrier is a source of alkali metal oxide (in particular $Na_2O$ or $K_2O$) in the final glass. If the use of sodium hydroxide presents a problem of corrosion of the material, sodium carbonate, which is also particularly effective, may be preferred to it.

The mixture comprises water. This water can originate in large part from the moisture of the waste products withdrawn from the fiberizing plant, which employs large amounts of water, in particular for collecting the waste products. Water can also be introduced into the mixture in order to achieve both a good mixing quality and a good ability for molding, indeed even for compaction.

The mixture also preferably comprises a non-cement alkaline earth metal carrier. The non-cement alkaline earth metal carrier comprises an alkaline earth metal and forms alkaline earth metal ions in the presence of water. It preferably comprises at least 10% by weight of alkaline earth metal (it is the % of the alkaline earth metal element, such as Ca or Mg, and not the percentage of its oxide) and preferably at least 20% by weight of alkaline earth metal. The non-cement alkaline earth metal carrier can be chosen from the following list:
  limestone or chalk ($CaCO_3$),
  quick lime CaO or slaked lime $Ca(OH)_2$, calcium magnesium carbonate or dolomite ($CaMg(CO_3)_2$),
  aragonite, vaterite or other $CaCO_3$ polymorphs.

A slag can be both a non-cement silica carrier and a non-cement alkaline earth metal carrier, their alkaline earth metal content generally being greater than 30% by weight. Mention may be made, as preferred non-cement alkaline earth metal carrier, of: a limestone, a dolomite or a quick lime. The particle size of the non-cement alkaline earth metal carrier has a particle size preferably such that the D50 is less than 100 μm and more preferably less than 50 μm. In a glassmaking application, this alkaline earth metal carrier is a source of alkaline earth metal oxide (in particular CaO or MgO) in the final glass.

It is possible to introduce, into the mixture, a mineral charge which can be chosen from mineral materials which are inert with respect to the binder system of the composite, which can be aggregates of use in the mechanical stability of the shaped composite or components of use for the vitrifiable charge from the viewpoint of enhancing in value in glass-making melting, in particular for its iron content. The aggregates generally exhibit a D50 of greater than 200 μm, in particular of greater than 1 mm. The mineral charge can be at least one charge chosen from a nonreactive slag or a gravel. It can concern aggregates originating from industrial recycling industries which enhance in value industrial byproducts (or coproducts) or byproducts (or coproducts) resulting from the demolition of buildings or waste dumps (ground materials of concretes, bricks, recycling of railroad ballasts, of crusts or of milled products of road surfacings or of mining waste tips). The slag optionally used here is coarse and is not regarded as being a non-cement silica carrier within the meaning given above as it does not form in particular silicate ions in the presence of water and is furthermore crystalline to more than 20% of its weight and has a high particle size with a median diameter D50 of greater than 50 μm, for example a D50 of greater than 200 μm, in particular of greater than 1 mm. It is the same for the gravel. LD slags resulting from converters, which are solidified without quenching treatment after their withdrawal, whereby they crystallize, may be concerned in particular. This mineral charge, inert insofar as it does not participate in the chemistry of the solidification of the briquette, is nevertheless a source of starting material of the mineral fiber which will be manufactured when the briquettes will be reused for the melting. This charge of aggregates can be introduced into the mixture forming the mass to be molded and thus into the shaped composite at a content of 5 to 50% by weight.

The mixture is preferably produced at basic pH, generally with a pH at least equal to 10 and preferably at least equal to 11. Such a pH is generally created by the alkali metal carrier, in particular NaOH. This high pH renders the medium aggressive with respect to the various carriers, which then more easily release their ions into solution.

The mixture according to the invention rapidly solidifies, with or without inert mineral charge. Generally, in the context of an industrial process, such a mineral charge is present. The non-cement silica carrier and the non-cement alkali metal carrier are the two main ingredients of the mineral binder which will be distributed and will cure around the undissolved material. The presence in addition in the mixture of an alkaline earth metal carrier is preferred. In the case of the presence of a non-cement alkaline earth metal carrier in the mixture, the alkaline earth metal ions created in the mixing water will also participate in the formation of the mineral binder.

In a particularly suitable mixture according to the invention, the non-cement silica carrier comprises a sodium silicate or a slag, said slag comprising at least 10% by weight of silica, being amorphous to more than 80% of its weight and its D50 being less than 100 μm, and the non-cement alkali metal carrier comprises sodium hydroxide or sodium silicate or sodium carbonate, a non-cement alkaline earth metal carrier comprising $Ca(OH)_2$ or $CaCO_3$ also being present in said mixture.

The sugar-comprising sizing composition generally comprises a sugar in a proportion of 30 to 90% by weight of the dry matter of the size (% of dry sugar with regard to the total weight of dry size).

The expression "sugar" used in the context of the present invention denotes one or more molecules chosen from monosaccharides, oligosaccharides or polysaccharides.

The sugar is at least one saccharide chosen from reducing, nonreducing and hydrogenated saccharides. The expression "reducing saccharide" should be understood in the conventional sense, namely a monosaccharide or a polysaccharide carrying a free hemiacetal OH group, this group having in particular a reducing action on alkaline copper solutions. Mention may be made, as examples of reducing monosaccharides, of reducing saccharides containing from 3 to 8 carbon atoms, preferably aldoses and advantageously the aldoses comprising from 5 to 7 carbon atoms. The aldoses which are particularly preferred are natural aldoses (belonging to the D series), in particular hexoses, such as glucose, mannose and galactose.

The expression "nonreducing saccharide" should be understood in the conventional sense, namely that it denotes a saccharide composed of several saccharide units, the 1 carbon of which carrying the hemiacetal OH group is involved in a bond. A reducing saccharide within the meaning of the invention does not exhibit any reducing action on alkaline copper solutions. Mention may be made, as examples of such nonreducing saccharides, of disaccharides, such as trehalose, isotrehaloses, sucrose and isosucroses; trisaccharides, such as melezitose, gentianose, raffinose, erlose and umbelliferose; tetrasaccharides, such as stachyose; and pentasaccharides, such as verbascose.

The term "hydrogenated saccharide" is understood to mean all of the products resulting from the reduction, in whatever way, of a saccharide chosen from monosaccharides, oligosaccharides or polysaccharides, which can be linear, branched or cyclic, and the mixtures of these products, in particular starch hydrolysates. Mention may be made, as examples of hydrogenated saccharides, of erythritol, arabitol, xylitol, sorbitol, mannitol, iditol, maltitol, isomaltitol, lactitol, cellobitol, palatinitol, maltotritol and hydrogenation products of starch hydrolysates.

The sugar-comprising size can comprise other compounds, such as a crosslinking agent, which can be chosen from monomeric or polymeric polyfunctional organic acids, in particular citric acid, primary or secondary amines, aqueous ammonia, or metal or ammonium salts of organic or inorganic acids, in particular ammonium or alkali metal or metal sulfate. It can also comprise a reactive compound comprising ethylenic unsaturation, which can in particular be the reaction product of maleic anhydride and tetraethylpentamine, which is particularly reactive with nonreducing sugars. It can also comprise additives, such as a silane, for example a silane comprising a polar terminal group, for example aminosilane, as coupling agent, or a silicone, as water-repelling agent. Mention may be made, by way of illustration of documents describing sizing compositions of use in the invention, of the documents US2010/0282996, US2012/0263934, WO2012/168619 and WO2012/168621, incorporated by reference.

The fragments of mineral wool comprise the sugar-comprising size before even being introduced into the mixture and coming into contact with the other ingredients of the mixture (aside from, if appropriate, a small amount of water already present on the fragments of mineral wool). The introduction, into the mixture, of the mineral wool, of the size and of the sugar is thus simultaneous, these three ingredients being combined within the fragments of mineral wool prior to being introduced into the mixture.

The fragments of mineral wool generally comprise a rock wool or a glass wool. The fragments of mineral wool are generally introduced into the mixture in a proportion of 10 to 60% by weight of the mixture.

The fragments of mineral wool comprising the sugar-comprising size can be a waste product from the manufacture of rock wool. The main components of the rock wool are:
$SiO_2$: 32 to 47% by weight
$Al_2O_3$: 15 to 22% by weight
CaO+MgO: 20 to 40% by weight
Iron oxide: 5 to 15% by weight The fragments of mineral wool comprising the sugar-comprising size can be a waste product from the manufacture of conventional glass wool. The main components of this glass wool are:
$SiO_2$: 50 to 75% by weight
$Al_2O_3$: 0 to 8% by weight
CaO+MgO: 5 to 20% by weight
Iron oxide: 0 to 3% by weight
$Na_2O+K_2O$: 12 to 20% by weight
$B_2O_3$: 2 to 10% by weight The fragments of mineral wool comprising the sugar-comprising size can be a waste product from the manufacture of alumina-rich glass wool. The main components of this alumina-rich glass wool are:
$SiO_2$: 35 to 50% by weight
$Al_2O_3$: 10 to 30% by weight
CaO+MgO: 12 to 35% by weight
Iron oxide: 2 to 10% by weight
$Na_2O+K_2O$: 0 to 20% by weight The fragments of mineral wool comprising the sugar-comprising size are generally introduced into the mixture in a proportion of 10 to 60% by weight (percentage of fragments of dry wool, it being understood that said fragments are generally introduced into the mixture in the wet state). The mineral wool can optionally be slightly ground before being introduced into the mixture so as to facilitate the mixing but it retains its fibrous nature since fibers with a length of greater than 5 mm are clearly distinguished with the naked eye.

The sizing composition included in the fragments of mineral wool is generally present in a proportion of 0.1 to 10% by weight and more particularly in a proportion of 0.5 to 7% by weight of size dry matter with respect to the total weight of fragments of dry wool.

The sum of the weights of the non-cement silica carriers and non-cement alkali metal carriers can represent from 5 to 30% by weight of the mixture. Of course, if a compound has the property of being both a non-cement silica carrier and a non-cement alkali metal carrier, it is counted only a single time in the determination of this sum by weight.

Preferably, the sum of the number of moles of silica introduced into the mixture by the non-cement silica carrier and of the number of moles of alkali metal introduced into the mixture by the non-cement alkali metal carrier is greater than 0.5 mol per kg of mixture. This sum is generally between 0.5 and 3 mol per kg of mixture.

Preferably, the ratio of the number of moles of silica introduced into the mixture by the non-cement silica carrier to the number of moles of alkali metal introduced into the mixture by the non-cement alkali metal carrier ranges from 0.2 to 3.

Preferably, the non-cement silica carrier introduces into the mixture at least 0.1 mol of silica per kg of mixture, in particular up to 3 mol of silica per kg of mixture and preferably from 0.1 to 2 mol of silica per kg of mixture.

Preferably, the non-cement alkali metal carrier introduces into the mixture at least 0.1 mol of alkali metal per kg of mixture and preferably from 0.1 to 1.5 mol of alkali metal per kg of mixture.

The presence of an alkaline earth metal carrier is preferred. If it is present, preferably, the non-cement alkaline earth metal carrier preferably introduces into the mixture at least 0.3 mol of alkaline earth metal per kg of mixture, in particular up to 3 mol of alkaline earth metal per kg of mixture and preferably from 0.3 to 2 mol of alkaline earth metal per kg of mixture.

Cement may not be introduced into the mixture and, if cement is introduced into the mixture, it is introduced in a proportion of less than 8% and preferably of less than 4% and more preferably still of less than 3% by weight of the mixture. Preferably, the ratio of the weight of cement to the weight of non-cement silica carrier, which preferably comprises at least 10% by weight of silica, is less than 1 and more preferably less than 0.5.

According to a particularly suitable mixture, the non-cement silica carrier and the non-cement alkaline earth metal carrier comprise one and the same slag (which means that they are both present at least partially within the same slag) and the non-cement alkali metal carrier comprises sodium carbonate, cement being introduced into the mixture in a proportion of less than 8% and preferably of less than 4% and more preferably of less than 3% by weight of the mixture, the water being present in the mixture preferably in a proportion of 5 to 30% of the weight of the mixture. Preferably, according to this particularly suitable mixture, more than 50% of the number of moles of silica introduced into the mixture by the non-cement silica carrier and more than 50% of the number of moles of alkaline earth metal introduced into the mixture by the non-cement alkaline earth metal carrier are introduced by the same slag. Preferably, according to this particularly suitable mixture, more than 50% of the number of moles of alkali metal introduced into the mixture by the non-cement alkali metal carrier are introduced into the mixture by sodium carbonate. If cement is introduced into the mixture, it is preferably introduced in a proportion of at least 0.1% by weight of the mixture.

The mixture for the preparation of the mass to be molded can be produced in any suitable mixer. It is generally unnecessary to heat the mixture by introducing heat into the mixture from the outside. The temperature of the mixture can rise due to the dissolution of certain ingredients, such as sodium hydroxide. Water is introduced in a sufficient amount for the mineral binder to be distributed throughout the mass to be molded but insufficiently so that the shaped composite retains its shape on removing from the mold, if appropriate after compaction. Generally, the water is present in the mixture in a proportion of 5 to 30% of the weight of the mixture.

The mass to be molded obtained by the mixing is subsequently converted into a shaped composite, in particular into briquettes, by molding and optionally compaction. In particular, the mass to be molded can be placed in a mold, vibrated in order to remove the trapped air and then optionally compacted by applying a pressure to one of the movable faces of the mold. The briquettes can, for example, have a volume of greater than 20 $cm^3$, in particular of between 100 and 1000 $cm^3$.

The shaped composite subsequently cures naturally. It can dry over time, so that its water content can be greatly reduced over the storage time. Its water content can vary according to its storage conditions.

Another subject matter of the invention is a shaped composite obtained by the process according to the invention.

Finally, a subject matter of the invention is a process for the manufacture of mineral wool, in which a molten mass is produced which is converted into mineral wool by means of a fiberizing device, a shaped composite obtained according to the invention being introduced as vitrifiable charge into a melting chamber, such as a cupola furnace.

In the following examples, there is first presented a series of examples (A) of base binder formulation demonstrating the effectiveness of the mixture according to the invention in the presence of fibers for preparing shaped composites in an experimental context. In another series of mixtures (B), the formulations incorporate aggregates of mineral charges.

EXAMPLES A1 to A11

The ingredients shown in table 1 are mixed in a mixer. The amounts indicated are parts by weight in grams of dry matter, apart, of course, from the "Total water" column, which adds up all the water introduced into the mixture, in whatever way that this is.

In table 1, the mineral waste products originated from the recovery of dust at different stages of the process for the manufacture of mineral wool and may be regarded as vitrifiable materials of particle or pseudofiber type. They are regarded as being an inert mineral charge which does not participate in the formation of the binder.

TABLE 1

(parts by weight)

| Ex. No. | Fiber | Sugar-comprising size | Phenolic resin | Total water | Cement | Active slag | Sodium silicate Na$_2$SiO$_3$•5H$_2$O | NaOH | Na$_2$CO$_3$ | Ca(OH)$_2$ | CaCO$_3$ | Mineral waste products |
|---|---|---|---|---|---|---|---|---|---|---|---|---|
| A1  | 33.6 | 0.7 |     | 16 | 12  | 0    | 0    | 0    | 0    |      |      | 10 |
| A2  | 33.6 |     | 0.7 | 16 | 12  | 0    | 0    | 0    | 0    |      |      | 10 |
| A3  | 33.6 | 0.7 |     | 16 | 0.6 | 11.4 | 1.44 | 1.44 |      |      |      | 10 |
| A4  | 33.6 | 0.7 |     | 16 | 0   | 12   | 1.44 | 1.44 |      |      |      | 10 |
| A5  | 33.6 | 0.7 |     | 16 | 0   | 12   |      |      |      | 4.32 | 1.44 | 10 |
| A6  | 33.6 | 0.7 |     | 16 | 6   | 6    |      |      |      |      |      | 10 |
| A7  | 33.6 | 0.7 |     | 16 | 0   | 12   | 4.32 |      |      |      |      | 10 |
| A8  | 33.6 | 0.7 |     | 16 | 0.6 | 11.4 | 4.32 |      |      |      |      | 10 |
| A9  | 33.6 | 0.7 |     | 16 | 0   | 12   | 4.32 | 1.44 |      |      |      | 10 |
| A10 | 33.6 | 0.7 |     | 16 | 0   | 12   | 1.44 | 1.44 |      |      | 1.44 | 10 |
| A11 | 33.6 | 0.7 |     | 16 | 2.4 | 9.6  |      |      | 4.32 |      |      | 10 |
| A12 | 33.6 | 0.7 |     | 16 | 3.6 | 8.4  |      |      | 4.32 |      |      | 10 |
| A13 | 33.6 | 0.7 |     | 16 | 6   | 6    |      |      | 4.32 |      |      | 10 |
| A14 | 33.6 | 0.7 |     | 16 | 12  | 0    |      |      | 4.32 |      |      | 10 |
| A15 | 33.6 | 0.7 |     | 16 | 2.4 | 9.6  |      |      | 4.32 | 1.44 |      | 10 |
| A16 | 33.6 | 0.7 |     | 16 | 6   | 6    |      |      | 4.32 | 1.44 |      | 10 |
| A17 | 33.6 | 0.7 |     | 16 | 12  | 0    |      |      | 4.32 | 1.44 |      | 10 |

The fragments of mineral wool comprised a rock wool fiber and a sugar-comprising sizing composition. The content of these fragments of mineral wool has been broken down in table 1 between what is mineral ("fiber" column) and the sizing composition. The size comprised, under dry conditions, 68% by weight of sucrose, 12% by weight of ammonium sulfate, 0.5% by weight of silane and 19.5% by weight of additives of the maleic anhydride and tetraethylpentamine type, these last two compounds being mixed together before mixing with the other ingredients of the sizing composition.

The fragments of mineral wool were introduced into the mixture in the wet state. In table 1, the "Fiber" column gives the amounts of fragments without water or sizing composition. The "Sugar-comprising size" and "Phenolic resin" columns give the amounts of sizing material which has been deposited on the rock wool. The "Total water" column gives the sum of the water initially introduced by the fragments and the water added. The cement used was a Portland cement. The active slag was a blast furnace slag and comprised (% by weight):

| | |
|---|---|
| SiO$_2$ | 32.3% |
| CaO | 38.2% (i.e., 27.3% of Ca) |
| MgO | 9.2% (i.e., 5.54% of Mg) |
| Al$_2$O$_3$ | 14.9% | and also other oxides in a minor proportion making up its composition to 100%. The slag was amorphous to more than 90% by weight. This slag is both a non-cement silica carrier and an alkaline earth metal carrier. Its particle size was fine since its D90 was less than 90 μm and its D50 was 30 μm.

The sizing composition comprised, in the dry state, 68% by weight of sucrose, 12% by weight of ammonium sulfate, 0.5% by weight of silane and 19.5% by weight of additives of the maleic anhydride and tetraethylpentamine type, these last two compounds being mixed together before mixing with the other ingredients of the sizing composition. The sodium silicate is both a silica carrier and an alkali metal carrier. It comprises 28.3% by weight of SiO$_2$ and 21.7% by weight of Na. It was amorphous to more than 80% by weight.

Test specimens with dimensions of 4 cm×4 cm×16 cm were produced by molding under vibration and then releasing from the mold. Two types of tests were carried out. Some involved the preparation of 4×4×16 cm$^3$ test specimens on which compressive strength tests were carried out, measured in MPa. For these tests, the compositions of table 1 were used without addition, to the mixture, of inert vitrifiable material of the inert slag or gravel type as this is not necessary in order to test the mineral binder according to the invention. The results of these tests are reported in the left-hand part of table 2 in the "Compressive strength (MPa) in 4×4×16 cm" column, as a function of the number of days (from 3 to 28 days). For other tests, the same compositions as in table 1 were prepared except that the fiber was absent. The sizing material was added to the composition without being deposited beforehand on fiber. In this test, the setting time of the mass of mixture is assessed during the curing thereof by giving a grade of 0 (no solidity) to 3 (very good solidity), from the resistance to the penetration of a spatula, as a function of the number of days (from 1 to 28 days).

These results are reported in the right-hand part of table 2 in the "Setting time (0 to 3) with regard to paste (without fibers)" column.

TABLE 2

| | Compressive strength (MPa) in 4 × 4 × 16 cm | | | | | | Setting time (0 to 3) with regard to paste (without fibers) | | | | | |
|---|---|---|---|---|---|---|---|---|---|---|---|---|
| Ex. No. | 3 d | 4 d | 7 d | 10 d | 14 d | 28 d | 1 d | 2 d | 3 d | 7 d | 14 d | 28 d |
| A1 | 0 | | 0 | | 0 | 0 | 0 | 0 | 0 | 0 | 0 | 0 |
| A2 | | | 8.4 | | 25 | 30 | 0 | 0 | 0 | 1 | 2 | 3 |
| A3 | | | 6.1 | | 21 | 27 | 3 | 3 | 3 | 3 | 3 | 3 |
| A4 | | | 7.6 | | 23 | 28 | 3 | 3 | 3 | 3 | 3 | 3 |

TABLE 2-continued

| | Compressive strength (MPa) in 4 × 4 × 16 cm | | | | | | Setting time (0 to 3) with regard to paste (without fibers) | | | | | |
|---|---|---|---|---|---|---|---|---|---|---|---|---|
| Ex. No. | 3 d | 4 d | 7 d | 10 d | 14 d | 28 d | 1 d | 2 d | 3 d | 7 d | 14 d | 28 d |
| A5 | | | 15.1 | 26 | | 35 | 3 | 3 | 3 | 3 | 3 | 3 |
| A6 | | | <3 | | <3 | <3 | 0 | 0 | 0 | 0 | 0 | 0 |
| A7 | | | 7 | 10.1 | 13.1 | 25 | 3 | 3 | 3 | 3 | 3 | 3 |
| A8 | | | | | | | 2 | 3 | 3 | 3 | 3 | 3 |
| A9 | | | 11 | | 15.6 | 20 | 3 | 3 | 3 | 3 | 3 | 3 |
| A10 | | 10.4 | 17 | | | 35.1 | 3 | 3 | 3 | 3 | 3 | 3 |
| A11 | | 7.4 | 13 | | 22.6 | 25 | 3 | 3 | 3 | 3 | 3 | 3 |
| A12 | | 5.8 | 13 | | 26.3 | 30 | 3 | 3 | 3 | 3 | 3 | 3 |
| A13 | | | 3.9 | | 6.75 | 9.9 | 0 | 0 | 1 | 2 | 3 | 3 |
| A14 | | | 2.8 | | 5 | 6.1 | 0 | 0 | 0 | 0 | 1 | 2 |
| A15 | | | 7.95 | | 23.8 | 30.1 | 3 | 3 | 3 | 3 | 3 | 3 |
| A16 | | | 0.8 | | 3 | 27.9 | 0 | 0 | 1 | 2 | 3 | 3 |
| A17 | | | <3 | | <3 | <3 | 0 | 0 | 0 | 0 | 1 | 2 |

It is found that the examples having high cement contents in the case of the presence of a sugar-comprising size lead to poor results. Examples A5 and A10, comprising the highest amount of alkaline earth metal carrier, give the best results in terms of compressive strength. In particular, the comparison of examples A4 and A10 shows that the increase in the amount of alkaline earth metal carrier greatly improves the results. This is because it is seen, in table 1, that the compositions of these two examples are identical except that a small amount of $CaCO_3$ has been added for example A10.

Table 3 gives the numbers of moles of non-cement silica, non-cement alkaline earth metal and non-cement alkali metal for the mixtures of the examples of table 1.

TABLE 3

| Ex. No. | Non-cement $SiO_2$ | Non-cement alkaline earth metal | Non-cement alkali metal |
|---|---|---|---|
| A1 | 0 | 0 | 0 |
| A2 | 0 | 0 | 0 |
| A3 | 0.068 | 0.104 | 0.05 |
| A4 | 0.071 | 0.109 | 0.05 |
| A5 | 0.064 | 0.129 | 0.08 |
| A6 | 0.032 | 0.055 | 0 |
| A7 | 0.085 | 0.109 | 0.04 |
| A8 | 0.082 | 0.104 | 0.04 |
| A9 | 0.085 | 0.109 | 0.076 |
| A10 | 0.072 | 0.123 | 0.05 |
| A11 | 0.052 | 0.087 | 0.08 |
| A12 | 0.045 | 0.076 | 0.08 |

TABLE 3-continued

| Ex. No. | Non-cement $SiO_2$ | Non-cement alkaline earth metal | Non-cement alkali metal |
|---|---|---|---|
| A13 | 0.032 | 0.055 | 0.08 |
| A14 | 0.000 | 0.000 | 0.08 |
| A15 | 0.052 | 0.107 | 0.08 |
| A16 | 0.032 | 0.074 | 0.08 |
| A17 | 0.000 | 0.019 | 0.08 |

The compositions shown in table 1 are devoid of high contents of inert mineral charge so as to facilitate the preparation of the test specimens for the curing tests. However, in real use, aggregates of inert mineral charge, such as gravel or inert coarse slag, are normally introduced into the mixture. These two charges are crystalline and made of large particles and are not silica or alkali metal or alkaline earth metal carriers within the meaning of the invention. Examples B1 to B17 illustrate compositions having higher contents of inert mineral charge.

EXAMPLES B1 to B17

Table 4 gives the percentages by weight of all the ingredients of mixtures corresponding to those of table 1 to which, however, 24 parts by weight of aggregates of inert mineral charge, consisting of 14 parts by weight of gravel and 20 parts by weight of inert coarse slag, have been added. The "Inert mineral charge" column represents the sum of the percentages of all the inert charges introduced, including the mineral waste products shown in table 1.

TABLE 4

(% by weight)

| Ex. No. | Fiber | Size with sugar | Phen. resin | Total water | Cement | Active slag | Sodium silicate $Na_2SiO_3 \cdot 5H_2O$ | NaOH | $Na_2CO_3$ | $Ca(OH)_2$ | $CaCO_3$ | Inert mineral charge |
|---|---|---|---|---|---|---|---|---|---|---|---|---|
| B1 | 31.61 | 0.66 | | 15.05 | 11.29 | | | | | | | 41.38 |
| B2 | 31.61 | 0.00 | 0.66 | 15.05 | 11.29 | | | | | | | 41.38 |
| B3 | 30.77 | 0.64 | | 14.65 | 0.55 | 10.44 | 1.32 | 1.32 | | | | 40.3 |
| B4 | 30.77 | 0.64 | | 14.65 | | 10.99 | 1.32 | 1.32 | | | | 40.3 |
| B5 | 29.98 | 0.62 | | 14.28 | | 10.71 | | | | 3.86 | 1.29 | 39.26 |
| B6 | 31.61 | 0.66 | | 15.05 | 5.64 | 5.64 | | | | | | 41.38 |
| B7 | 30.37 | 0.63 | | 14.46 | | 10.85 | 3.91 | | | | | 39.78 |
| B8 | 30.37 | 0.63 | | 14.46 | 0.54 | 10.31 | 3.91 | | | | | 39.78 |
| B9 | 29.98 | 0.62 | | 14.28 | | 10.71 | 3.86 | | 1.29 | | | 39.26 |
| B10 | 30.37 | 0.63 | | 14.46 | | 10.85 | 1.30 | 1.30 | | | 1.30 | 39.78 |
| B11 | 30.37 | 0.63 | | 14.46 | 2.17 | 8.68 | | | 3.91 | | | 39.78 |

TABLE 4-continued (% by weight)

| Ex. No. | Fiber | Size with sugar | Phen. resin | Total water | Cement | Active slag | Sodium silicate Na$_2$SiO$_3$·5H$_2$O | NaOH | Na$_2$CO$_3$ | Ca(OH)$_2$ | CaCO$_3$ | Inert mineral charge |
|---|---|---|---|---|---|---|---|---|---|---|---|---|
| B12 | 30.37 | 0.63 | | 14.46 | 3.25 | 7.59 | | | 3.91 | | | 39.78 |
| B13 | 30.37 | 0.63 | | 14.46 | 5.42 | 5.42 | | | 3.91 | | | 39.78 |
| B14 | 30.37 | 0.63 | | 14.46 | 10.85 | | | | 3.91 | | | 39.78 |
| B15 | 29.98 | 0.62 | | 14.28 | 2.14 | 8.57 | | | 3.86 | 1.29 | | 39.26 |
| B16 | 29.98 | 0.62 | | 14.28 | 5.35 | 5.35 | | | 3.86 | 1.29 | | 39.26 |
| B17 | 29.98 | 0.62 | | 14.28 | 10.71 | | | | 3.86 | 1.29 | | 39.26 |

Table 5 gives the numbers of moles per kg of briquette of different carriers and some ratios for the compositions of the examples of table 4.

TABLE 5

| Ex. No. | Number of moles of non-cement SiO$_2$/kg of briquette | Number of moles of non-cement alkaline earth metal/kg of briquette | Number of moles of non-cement alkali metal/kg of briquette | Sum of the number of moles of silica and of alkali metal/kg of briquette | Ratio of the number of moles of silica to the number of moles of alkali metal | Ratio of weight of cement to weight of silica carriers |
|---|---|---|---|---|---|---|
| B1 | 0.000 | 0.000 | 0.000 | 0.000 | — | — |
| B2 | 0.000 | 0.000 | 0.000 | 0.000 | — | — |
| B3 | 0.623 | 0.953 | 0.458 | 1.081 | 1.360 | 0.05 |
| B4 | 0.650 | 0.998 | 0.458 | 1.108 | 1.420 | 0.00 |
| B5 | 0.571 | 1.151 | 0.714 | 1.285 | 0.800 | 0.00 |
| B6 | 0.301 | 0.517 | 0.000 | 0.301 | — | 1.00 |
| B7 | 0.768 | 0.985 | 0.362 | 1.130 | 2.125 | 0.00 |
| B8 | 0.741 | 0.940 | 0.362 | 1.103 | 2.050 | 0.04 |
| B9 | 0.759 | 0.973 | 0.678 | 1.437 | 1.118 | 0.00 |
| B10 | 0.651 | 1.112 | 0.452 | 1.103 | 1.440 | 0.00 |
| B11 | 0.470 | 0.786 | 0.723 | 1.193 | 0.650 | 0.25 |
| B12 | 0.407 | 0.687 | 0.723 | 1.130 | 0.563 | 0.43 |
| B13 | 0.289 | 0.497 | 0.723 | 1.012 | 0.400 | 1.00 |
| B14 | 0.000 | 0.000 | 0.723 | 0.723 | 0.000 | — |
| B15 | 0.464 | 0.955 | 0.714 | 1.178 | 0.650 | 0.25 |
| B16 | 0.286 | 0.660 | 0.714 | 0.999 | 0.400 | 1.00 |
| B17 | 0.000 | 0.170 | 0.714 | 0.714 | 0.000 | — |

The invention claimed is:

1. A process for preparing a shaped composite, the process comprising:

mixing fragments of mineral wool sized with a sizing composition comprising a sugar with a non-cement silica carrier distinct from the wool, a non-cement alkali metal carrier distinct from the wool, and water, to obtain a mixture, wherein the non-cement silica carrier and the non-cement alkali metal carrier form, with the water, a mineral binder that gradually solidifies around solid particles present in the mixture; and then shaping the mixture into a shaped composite.

2. The process of claim 1, wherein a pH of the mixture is at least equal to 10.

3. The process of claim 1, wherein the fragments of mineral wool comprise a rock wool or a glass wool.

4. The process of claim 1, wherein the fragments of mineral wool are introduced into the mixture in a proportion of 10 to 60% by weight of the mixture.

5. The process of claim 1, wherein a sum of weights of the non-cement silica carrier and the non-cement alkali metal carrier is from 5 to 30% by weight of the mixture.

6. The process of claim 1, wherein the mixture comprises from 5 to 50% by weight of aggregates.

7. The process of claim 1, wherein a sum of the moles of silica introduced into the mixture by the non-cement silica carrier and of the moles of alkali metal introduced into the mixture by the non-cement alkali metal carrier is greater than 0.5 mol per kg of mixture.

8. The process of claim 1, wherein the sizing composition is present in the fragments of mineral wool in a proportion of 0.1 to 10% by weight of size dry matter with respect to a total weight of fragments of dry wool.

9. The process of claim 1, wherein either no cement is introduced into the mixture or cement is introduced into the mixture in a proportion of less than 8% by weight of the mixture.

10. The process of claim 1, wherein either no cement is introduced into the mixture or cement is introduced into the mixture such that a ratio of weight of the cement to weight of non-cement silica carrier is less than 1.

11. The process of claim 1, wherein a ratio of number of moles of silica introduced into the mixture by the non-cement silica carrier to moles of alkali metal introduced into the mixture by the non-cement alkali metal carrier ranges from 0.2 to 3.

12. The process of claim 1, wherein the non-cement silica carrier introduces into the mixture at least 0.1 mol of silica per kg of the mixture.

13. The process of claim 1, wherein the non-cement alkali metal carrier introduces into the mixture at least 0.1 mol of alkali metal per kg of mixture.

14. The process of claim 1, wherein the mixture further comprises a non-cement alkaline earth metal carrier distinct from the wool.

15. The process of claim 14, wherein the non-cement alkaline earth metal carrier comprises $Ca(OH)_2$ or $CaCO_3$.

16. The process of claim 14, wherein:
the non-cement silica carrier and the non-cement alkaline earth metal carrier comprise one and the same slag, and the non-cement alkali metal carrier comprises sodium carbonate; and
cement is introduced into the mixture in a proportion of less than 8% by weight of the mixture.

17. The process of claim 16, wherein the cement is introduced into the mixture in a proportion of at least 0.1% by weight of the mixture.

18. The process of claim 16, wherein more than 50% of moles of silica introduced into the mixture by the non-cement silica carrier and more than 50% of moles of alkaline earth metal introduced into the mixture by the non-cement alkaline earth metal carrier are introduced into the mixture by the same slag.

19. The process of claim 16, wherein more than 50% of moles of alkali metal introduced into the mixture by the non-cement alkali metal carrier are introduced into the mixture by sodium carbonate.

20. The process of claim 1, wherein the non-cement silica carrier comprises a sodium silicate or a slag, said slag comprising at least 10% by weight of silica, being amorphous to more than 80% of its weight and its D50 being less than or equal to 100 μm.

21. The process of claim 1, wherein the non-cement alkali metal carrier comprises sodium hydroxide, sodium silicate or sodium carbonate.

22. The process of claim 1, wherein the water is present in the mixture in a proportion of 5 to 30%6 of the weight of the mixture.

23. The process of claim 1, wherein the sugar is present in the sizing composition in a proportion of 30 to 90% by weight of the dry matter of the size.

24. The process of claim 1, wherein a D50 of the non-cement silica carrier is less than or equal to 100 μm.

25. The process of claim 1, wherein the shaped composite in the form of briquettes, in which conversion of the mixture into the briquettes occurs by molding and optionally compaction.

26. A process for manufacturing mineral wool, the process comprising producing a molten mass that is converted into mineral wool with a fiberizing device, wherein the shaped composite of claim 1 is introduced as a vitrifiable charge into a melting chamber.

27. A process for preparing a shaped composite, the process comprising:
mixing fragments of mineral wool sized with a sizing composition comprising a sugar with a non-cement silica carrier distinct from the wool, a non-cement alkali metal carrier distinct from the wool, and water to obtain a mixture, wherein the non-cement silica carrier and the non-cement alkali metal carrier form, with the water, a mineral binder that gradually solidifies around solid particles present in the mixture; and then
shaping the mixture into a shaped composite
wherein a ratio of number of moles of silica introduced into the mixture by the non-cement silica carrier to moles of alkali metal introduced into the mixture by the non-cement alkali metal carrier ranges from 0.2 to 3, and
wherein the water is present in the mixture in a proportion of 5 to 30% of the weight of the mixture.

28. The process of claim 27, wherein:
the non-cement silica carrier and the non-cement alkaline earth metal carrier comprise one and the same slag, and the non-cement alkali metal carrier comprises sodium carbonate; and
cement is introduced into the mixture in a proportion of less than 8% by weight of the mixture.

29. The process of claim 27, wherein:
the non-cement silica carrier and the non-cement alkaline earth metal carrier comprise one and the same slag, and the non-cement alkali metal carrier comprises sodium carbonate;
cement is introduced into the mixture in a proportion of less than 8% by weight of the mixture; and
more than 50% of moles of silica introduced into the mixture by the non-cement silica carrier and more than 50% of moles of alkaline earth metal introduced into the mixture by the non-cement alkaline earth metal carrier are introduced into the mixture by the same slag.

30. A process for preparing a shaped composite, the process comprising:
mixing fragments of mineral wool sized with a sizing composition comprising a sugar with a non-cement silica carrier distinct from the wool, a non-cement alkali metal carrier distinct from the wool, a non-cement alkaline earth metal carrier distinct from the wool, and water to obtain a mixture, wherein the non-cement silica carrier and the non-cement alkali metal carrier form, with the water, a mineral binder that gradually solidifies around solid particles present in the mixture; and then
shaping the mixture into a shaped composite,
wherein the water is present in the mixture in a proportion of 5 to 30% of the weight of the mixture.

31. The process of claim 30, wherein:
the non-cement silica carrier and the non-cement alkaline earth metal carrier comprise one and the same slag, and the non-cement alkali metal carrier comprises sodium carbonate; and
cement is introduced into the mixture in a proportion of less than 8% by weight of the mixture.

32. The process of claim 30, wherein:
the non-cement silica carrier and the non-cement alkaline earth metal carrier comprise one and the same slag, and the non-cement alkali metal carrier comprises sodium carbonate;
cement is introduced into the mixture in a proportion of less than 8% by weight of the mixture; and
a ratio of number of moles of silica introduced into the mixture by the non-cement silica carrier to moles of alkali metal introduced into the mixture by the non-cement alkali metal carrier ranges from 0.2 to 3.

33. The process of claim 30, wherein:
the non-cement silica carrier and the non-cement alkaline earth metal carrier comprise one and the same slag, and the non-cement alkali metal carrier comprises sodium carbonate;
cement is introduced into the mixture in a proportion of less than 8% by weight of the mixture;
a ratio of number of moles of silica introduced into the mixture by the non-cement silica carrier to moles of alkali metal introduced into the mixture by the non-cement alkali metal carrier ranges from 0.2 to 3; and more than 50% of moles of silica introduced into the mixture by the non-cement silica carrier and more than 50% of moles of alkaline earth metal introduced into the mixture by the non-cement alkaline earth metal carrier are introduced into the mixture by the same slag.

* * * * *